United States Patent
Götz et al.

(10) Patent No.: US 10,714,946 B2
(45) Date of Patent: Jul. 14, 2020

(54) METHOD FOR INITIALIZING A DC CHARGING PROCESS OF A BATTERY BY MEANS OF AN INVERTER

(71) Applicant: Dr. Ing. h.c. F. Porsche Aktiengesellschaft, Stuttgart (DE)

(72) Inventors: Stefan Götz, Forstern (DE); Till Lütje, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 140 days.

(21) Appl. No.: 16/138,188

(22) Filed: Sep. 21, 2018

(65) Prior Publication Data
US 2019/0109462 A1   Apr. 11, 2019

(30) Foreign Application Priority Data
Oct. 9, 2017 (DE) .......... 10 2017 123 346

(51) Int. Cl.
*H02J 7/00* (2006.01)
*B60L 53/16* (2019.01)
*B60L 55/00* (2019.01)
*B60L 53/10* (2019.01)
*H01M 10/44* (2006.01)

(52) U.S. Cl.
CPC .......... *H02J 7/00036* (2020.01); *B60L 53/11* (2019.02); *B60L 53/16* (2019.02); *B60L 55/00* (2019.02); *H01M 10/44* (2013.01); *H02J 7/00* (2013.01); *H01M 2220/20* (2013.01); *H02J 2207/20* (2020.01)

(58) Field of Classification Search
None
See application file for complete search history.

(56) References Cited

U.S. PATENT DOCUMENTS 9,331,515 B2 * 5/2016 Feuerstack ............... H02J 5/00
2012/0019174 A1 * 1/2012 Mahlein ................. H02J 7/022
                                                        318/139

FOREIGN PATENT DOCUMENTS

DE         4107391 A1    9/1992
DE   102016222163 B3    7/2017

OTHER PUBLICATIONS

Electric vehicle conductive charging system—Part 23: DC Electric vehicle charging station (IEC 61851-23:2014): DIN EN 61851-23 (VDE 0122-2-3), Nov. 2014, pp. 1-86, with partial English translation.

* cited by examiner

Primary Examiner — David V Henze-Gongola
(74) Attorney, Agent, or Firm — RatnerPrestia

(57) ABSTRACT

A method for charging a battery of an electric vehicle, at a direct-current charging apparatus, wherein the vehicle has an inverter which is connected to the battery, and an electric motor which is connected to the inverter. During the charging process, the inverter and at least one inductor of the electric motor are used for the step-up conversion of a low charging voltage of the direct-current charging apparatus into a higher voltage which is required for charging the battery.

10 Claims, 3 Drawing Sheets

METHOD FOR INITIALIZING A DC CHARGING PROCESS OF A BATTERY BY MEANS OF AN INVERTER

FIELD OF THE INVENTION

The invention relates to methods for charging electric vehicle batteries.

CROSS-REFERENCE TO RELATED APPLICATION

This application claims priority to German Patent Application No. DE 10 2017 123 346.6, filed Oct. 9, 2017, which is incorporated by reference herein in its entirety.

BACKGROUND OF THE INVENTION

Fast DC charging stations (DC: direct current) for electric cars which are available at present usually operate with a charging voltage of 400 volts. The charging power of charging stations of this kind lies in the region of 50 kilowatts. In order to allow even faster charging processes and therefore to further improve the user friendliness, in particular from the point of view of the ratio of driving time to charging time, higher battery voltages, which lie far above 400 V of the typical fast DC charging posts, are increasingly being used in drive systems of electrically driven vehicles. One example which may be mentioned here is the turbocharging concept by Porsche in which the voltage level during the charging process is 800 volts. Doubling the voltage level with the current intensity remaining the same and therefore with the same electrical loading of the charging pin on the charging cable allows the charging time to be halved.

However, for the user of a modern electric vehicle in which the 800-volt high-power charging technique is used, this can be problematical since, at present, the majority of fast charging stations still operate at a voltage level of 400 volts and cannot provide 800 volts. In order to nevertheless be able to charge an electric vehicle with the 800-volt high-power charging technique at existing 400 V fast charging posts, DC voltage conversion has to be performed, by means of which the charging voltage of the charging post is increased from, for example, 400 V to 800 V for the HV vehicle battery.

This DC/DC conversion which is required for raising the voltage level can be performed, for example, by a dedicated DC/DC converter which, however, on account of the high power required, is expensive and occupies a large amount of installation space, and therefore does not constitute a practical solution to the problem. In addition, a DC/DC converter of this kind increases the weight of the vehicle to a significant extent, as a result of which the range is adversely affected.

As an alternative, the inverter of the vehicle, which is also called the drive inverter, can be used for a purpose other than that intended. The functioning of a step-up converter (also called boost converter) can be replicated with the aid of the phase inductance of the electrical machine and by suitably driving the semiconductor elements of the drive inverter. The step-up converter then converts the relatively low voltage of the charging post to the higher voltage of the high-voltage battery (called HV battery in the text which follows) of the vehicle, wherein the conversion is performed by means of the phase inductor of the electrical machine (from phase to star point). A charging process which takes place by means of the drive inverter of the electric car has the advantage that an 800 V HV battery can be charged at any conventional charging post by said charging process, without the use of additional charging electronics (such as, for example, a dedicated DC/DC converter).

The charging process of electric vehicles at charging stations can be standardized, for example, in accordance with the mandates of the international standard IEC 61851 (International Electrotechnical Commission), which is incorporated by reference herein, wherein this series of standards is applicable in a number of European countries. According to this standard, the charging station is at zero voltage until an electric vehicle is connected, and the charging current is switched on only after a staffing or initialization sequence has been successfully run. In addition to checking the insulation of the vehicle, voltage synchronization is a primary objective of the starting sequence. This is understood to mean matching the charging voltage of the charging post to the voltage of the HV battery (within a predefined tolerance). During the charging process of an HV battery which takes place by means of the drive inverter, the charging station is not connected directly to the battery of the vehicle as is usually the case, but rather is connected to one of the two poles at the star point of the electrical machine. As a result, the drive inverter and the electrical machine are connected between the charging station and the HV battery, so that this topology does not permit voltage synchronization in accordance with the mandates of IEC 61851.

SUMMARY OF THE INVENTION

This object of the present invention is to provide a protocol for the starting process of the DC charging process and for the accompanying communication between the vehicle and the charging station.

The object of the present invention is achieved, by a method for charging a battery of an electric vehicle, in particular a traction battery, as claimed in independent claim 1. The method according to aspects of the invention is based on a charging process at a direct-current charging apparatus, for example, a charging post of a charging point for electric cars. The electrical infrastructure which is already present in the electric vehicle, in particular the drive inverter and the electrical machine (electric motor) which is connected to it, can be used during the charging process in order to increase an excessively low voltage level of the direct-current charging apparatus to a higher voltage level which is required for charging the HV battery of the electric vehicle. The method presented here is compatible with the charging method standardized in accordance with IEC 61851 (German version DIN EN 61851-23 (VDE 0122-2-3)) where the standard relates to cable-bound battery charging processes at direct-current charging stations (DC charging stations) for electric vehicles. The properties of the "Combined Charging System" which are provided for Europe are described in Annex CC of the standard. The method presented here corresponds to a modification to the charging method described in Section 3.2 "Normal Starting Process" of Annex CC of IEC Standard 61851 if the DC charging voltage of the direct-current charging station is too low, that is to say differs from the operating voltage of the HV battery to a considerable extent, and therefore has to be increased.

At the beginning of the method according to aspects of the invention, a vehicle-side charging interface is connected to the direct-current charging apparatus, whereinfirst pole of the direct-current charging apparatus is coupled to a first pole of the battery, and the second pole of the direct-current charging apparatus is coupled to the star point of the electric motor. The first pole of the direct-current charging apparatus and the first pole of the battery, which poles are coupled to one another, may be poles of the same polarity, that is to say the positive pole or the negative pole in each case. The correspondingly other pole of the direct-current charging apparatus is then coupled to the star point of the electric motor. There is no current flow at this point in time since initialization and checking of the insulation are initially carried out. Then, a first voltage, which corresponds to the voltage of the battery, is ascertained. The first voltage can be tapped off, for example, directly between the poles of the battery.

Proceeding from the ascertained first voltage, at least one switch of the inverter, which is arranged between a first pole of the battery and an inductor of the electric motor, is then driven in such a way that the switch moves to clocked operation. The driven switch may be any desired low-side switch (if the second pole of the battery is the positive pole) or high-side switch (if the second pole of the battery is the negative pole) of the inverter, (usually a transistor such as, for example, a high-power MOSFET), that is to say a switch which provides a switchable conductive connection between an inductor of the electrical machine and the first pole of the battery. The at least one switch, the associated phase inductor and the associated diode, which is arranged in parallel with the other switch which is arranged in the half-bridge of the driven switch, form a step-up converter given suitable driving of the switch. If necessary, the corresponding components of the other half-bridges, together with the associated phase inductor, can be used in order to realize further step-up converters which are connected in parallel with one another. Therefore, in the case of a three-phase electric motor for example, two low-side or high-side switches or three low-side or high-side switches can all be driven in a clocked manner in the same way in order to provide two or three step-up converters which are connected in parallel. Clocking the operation of the at least one switch determines the transmission ratio or the duty cycle of the associated step-up converter. Owing to the clocked operation of the switch, a second voltage is established between the first pole of the battery, to which a connection of the switch which is operated in a clocked manner is connected, and the star point of the electrical machine, said second voltage being lower than the first voltage. The second voltage also corresponds to the voltage which is established at the charging contactors on the vehicle side. A charging contactor can be understood to mean an isolator switch which is used to electrically connect/isolate the vehicle-side charging socket from the HV system that is to say the direct-current charging apparatus.

In the next step of the method according to aspects of the invention, the second voltage which has become established between the star point of the electric motor and the first pole of the battery by the clocked operation of the at least one switch of the inverter is ascertained. A difference between the second voltage and the DC charging voltage which is provided by the direct-current charging apparatus is then ascertained. Finally, if the ascertained difference exceeds a prespecified limit value, the DC charging voltage and/or the second voltage are adjusted. The objective of the adjustment is to minimize the difference between the second voltage and the DC charging voltage, so that said difference is at least smaller than the prespecified limit value. If this condition is met, the electric vehicle can transmit a power request message to the direct-current charging apparatus in order to signal its readiness for the charging process.

The objective pursued by way of the clocked operation of the at least one switch of the drive inverter is that the value of the second voltage corresponds to the DC charging voltage in the optimum case. In practice, it is sufficient for the deviation between the second voltage and the DC charging voltage to lie within a predefined tolerance, for example to be not more than 20 V, as prespecified in Section 3.2 of Annex CC of IEC Standard 61851. The initially established duty cycle (for example D=0.75) can correspond to a predetermined standard duty cycle. The initially established duty cycle can be iteratively adjusted by means of a closed control loop in order to match the second voltage with the DC charging voltage. Initial duty cycles, which are present in a memory such that they can be called up, can be associated with the situation-dependent voltage conversions (for example from 800 V of the HV battery to 400 V of the DC voltage charging station), so that matching of the voltages can be achieved more quickly.

According to a further exemplary embodiment of the method, adjusting the DC charging voltage can comprise transmitting at least one message to the direct-current charging apparatus. A voltage value of the DC charging voltage, which voltage value is required for the battery of the electric vehicle, can be transmitted to the DC voltage charging station by means of the at least one message which may be a cyclical message 5b in accordance with Section 3.2 of Annex CC of IEC Standard 61851. Since the second voltage, starting from a reduced battery voltage, is established by the clocked operation of the switch of the drive inverter, according to one embodiment of the method according to aspects of the invention, the DC charging voltage can therefore be matched to the current setting of the duty cycle. As a result, after switching off the insulation and in the case of an incipient charging current, said DC charging voltage which is set in this way is automatically increased to the operating voltage of the battery by the step-up converter.

According to a further exemplary embodiment of the method, adjusting the second voltage comprises adjusting the switch-on time of the at least one switch. Adjusting the switch-on time of the at least one switch corresponds to adjusting the duty cycle of the step-up converter by means of which the second voltage can be directly adjusted. This measure can be performed as an alternative or in addition to (that is to say together with) adjusting the DC charging voltage.

According to a further exemplary embodiment, the method can further comprise deactivating an insulation apparatus for creating a current flow from the direct-current charging apparatus to the battery when the difference between the second voltage and the DC charging voltage lies below the prespecified limit value. Deactivating an insulation apparatus can correspond to the process according to Section 3.2 of Annex CC of IEC Standard 61851 which takes place in the time period (t6->t7).

As mentioned in the introductory part, after connection of the charging plug of the direct-current charging apparatus to the vehicle-side charging interface, current first flows when initialization and checking of the insulation are successfully run. The insulation apparatus is active during this time.

According to a further exemplary embodiment of the method, the switch-on time of the at least one switch can be set depending on the first voltage, that is to say the battery voltage. To this end, for example, various values for the initial duty cycle of the switch can be stored in a memory and can be accessed during the course of the method. The duty cycles can be present, for example, in a two-dimensional array, wherein a duty cycle which is optimum in a respective charging environment can be dependent both on the voltage of the HV battery of the electric vehicle and also on the DC charging voltage.

According to a further exemplary embodiment, the method can further comprise transmitting a precharging request to the direct-current charging apparatus for setting the DC charging voltage which is provided by it. A setpoint value for the charging current and also a setpoint value for the DC charging voltage can be transmitted to the direct-current charging apparatus by means of the precharging request. The precharging phase, as defined in Section 3.2 of Annex CC of IEC Standard 61851, begins with the transmission of the precharging request.

According to a further exemplary embodiment, the clocked driving of the at least one switch is performed at the same time as or after a first voltage is ascertained. In other words, enabling for the switch of the drive inverter, which allows access to the switch, and starting of driving of the switch can take place at time t5, as is defined in Section 3.2 of Annex CC of IEC Standard 61851. Driving of the at least one switch can preferably be performed by means of a PWM signal.

By means of the method according to aspects of the invention, the starting process of the DC charging process can be defined such that it is compatible with the mandates of IEC Standard 61851. The method presented here constitutes a supplement or extension to the standardized starting process according to IEC 61851 which takes into account the modified electrical circuit topology of the drive inverter charging which is required for the voltage conversion.

BRIEF DESCRIPTION OF THE DRAWING

Further details, features and advantages of the invention can be gathered from the following description of preferred embodiments with reference to the drawings. Here, the drawings illustrate merely exemplary embodiments of the invention which do not restrict the essential idea of the invention. In particular, the dimensions and geometric relationships between the elements illustrated in the figures should not be deemed to be limiting. The terms "coupled" or "connected" which are used within the scope of this application are to be generally understood with respect to electrical components as meaning that the corresponding electrical components are connected to one another by means of electrical connections which are specifically provided.

DETAILED DESCRIPTION OF THE INVENTION

Figure 1:
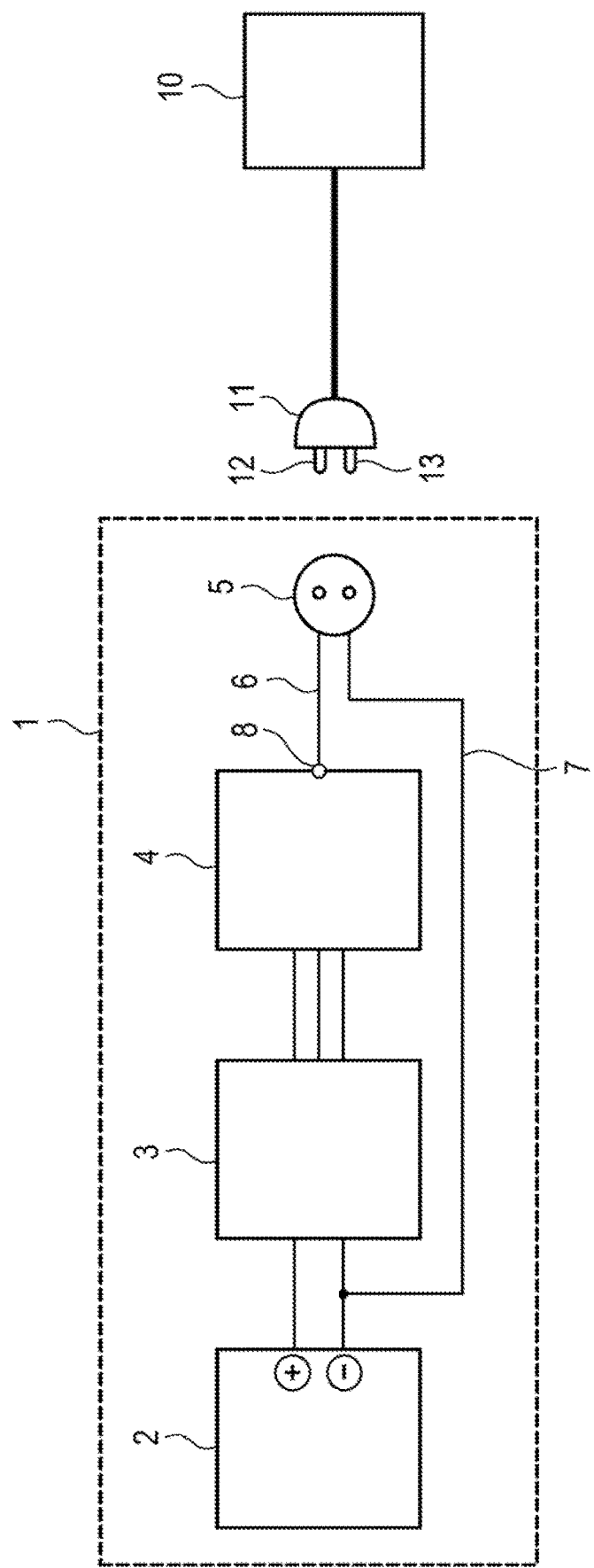
FIG. 1 illustrates the charging process according to aspects of the invention of the battery in an electric vehicle.

FIG. 1 illustrates the method according to aspects of the invention for charging a battery 2 of an electric vehicle at a direct-current charging apparatus 10. On the vehicle side, the battery 2 is coupled to a preferably bidirectional drive inverter 3 which, in turn, is coupled to an electric motor 4 (electrical machine). The electric motor 4 is usually operated in a three-phase star circuit, so that the drive inverter 3 also has three phases. Instead of a three-phase system, higher-phase systems, for example four-phase, five-phase, six-phase systems, can also be used. The drive inverter 3 (also called power electronics) converts the DC voltage of the HV battery 2 into a three-phase AC voltage which is required for operating the electric motor 4. The electric motor 4 converts the electrical energy into mechanical energy which leads to movement of the vehicle. The battery 2, the drive inverter 3 and the electric motor 4 are the main constituent parts of an exclusive or supplementary electric drive train 1 of an electric vehicle. In general, the drive train can also be designed for more than three phases.

The method according to aspects of the invention proceeds from a scenario in which the direct-current charging apparatus 10 is not able to provide a charging voltage which is high enough for charging the battery 2 of the electric vehicle. In practice, the situation may occur that the direct-current charging apparatus 10, which comprises a charging plug 11 with at least a first, contact 12 and a second contact 13, is a 400 V charging post but the vehicle has a modern electric drive of which the HV battery 2 has an operating voltage of 800 V. In a case of this kind, the HV battery 2 cannot be directly connected to the direct-current charging apparatus 10 in the usual manner, that is to say by means of the two charging contacts of the vehicle-side charging socket 5 substantially to the two contacts 12, 13 of the charging plug 11 of the direct-current charging apparatus 10.

During the course of the method according to aspects of the invention, in a case of this kind, the charging contacts of the vehicle-side charging socket 5 are connected up differently in comparison to the conventional charging process in which the two charging contacts of the vehicle-side charging socket 5 are connected substantially to the two poles of the battery 2. FIG. 1 illustrates first exemplary embodiment in which the charging contact of the vehicle-side charging socket 5, which charging contact is usually connected to the positive pole of the battery 2, is connected to the star point 8 of the electric motor 4 by means of a first line 6 which is coupled to the top contact of the vehicle-side charging socket 5. To this end, the star point 8 within the electric vehicle can be correspondingly routed out. Therefore, the positive pole of the direct-current charging post 10, which corresponds to the first contact 12 in FIG. 1, is connected to the star point 8 of the electric motor 4. In the exemplary embodiment illustrated in FIG. 1, the electrical connection of the negative pole of the direct-current charging post 10, which negative pole corresponds to the second contact 13 in FIG. 1, to the negative pole of the HV battery 2 by means of a second line 7 remains unchanged, wherein the second line 7 is coupled to the lower contact of the vehicle-side charging socket 5. This circuit configuration, which is modified in comparison to the usual charging process, can be realized, for example, with a two-way switch which, depending on the position configures is the charging socket 5 such that the corresponding charging contact is coupled either to the star point 8 of the electrical machine 4 or directly to the positive pole of the battery 2. In a departure from the exemplary embodiment shown in FIG. 1, according to a further exemplary embodiment, the vehicle-side charging socket 5 can also be connected up in a different way, specifically in such a way that the first contact 12 of the charging plug 11 (that is to say the positive pole of the direct-current charging post 10) is coupled to the positive pole of the HV battery 2, and the second contact 13 of the charging plug 11 (that is to say the negative pole of the direct-current charging post 10) is coupled to the star point 8 of the electric motor 4. Accordingly, the first line 6 would then, in contrast to the manner shown in FIG. 1, be coupled to the line which runs between the positive pole of the HV battery 2 and the drive inverter 3 and the second line 7 would be coupled to the star point 8 of the electrical machine.

During normal operation of the electric vehicle, energy flows from the HV battery 2 to the electric motor 4. This direction of energy flow is called the normal direction of energy flow in the text which follows. During the charging method according to the present invention, energy flows backward, that is to say from the direct-current charging apparatus 10, across at least one inductor of the electric motor 4, through the drive inverter 3, to the HV battery 2, wherein an inductor of the electrical machine 4 and at least one associated branch of the inverter 3, for example the associated half-bridge, are operated as step-up converters. The, star point 8, shown in FIG. 1, of the electrical machine 4 is used as an access point according to the method according to aspects of the invention, in order to realize a boost converter counter to the normal direction of energy flow. In this case, a phase inductor of the electric motor 4 functions as a boost inductor of the DC/DC converter. In principle, the star point in electrical machines is neither accessible nor electrically contactable. For the purpose of realizing the method according to aspects of the invention, the electric vehicle can be correspondingly prepared and the star point can be routed out of the housing in a specific manner. The manner of operation of a step-up converter as such will not be discussed in any detail within the scope of this application since this is well known from the prior art.

Figure 2:
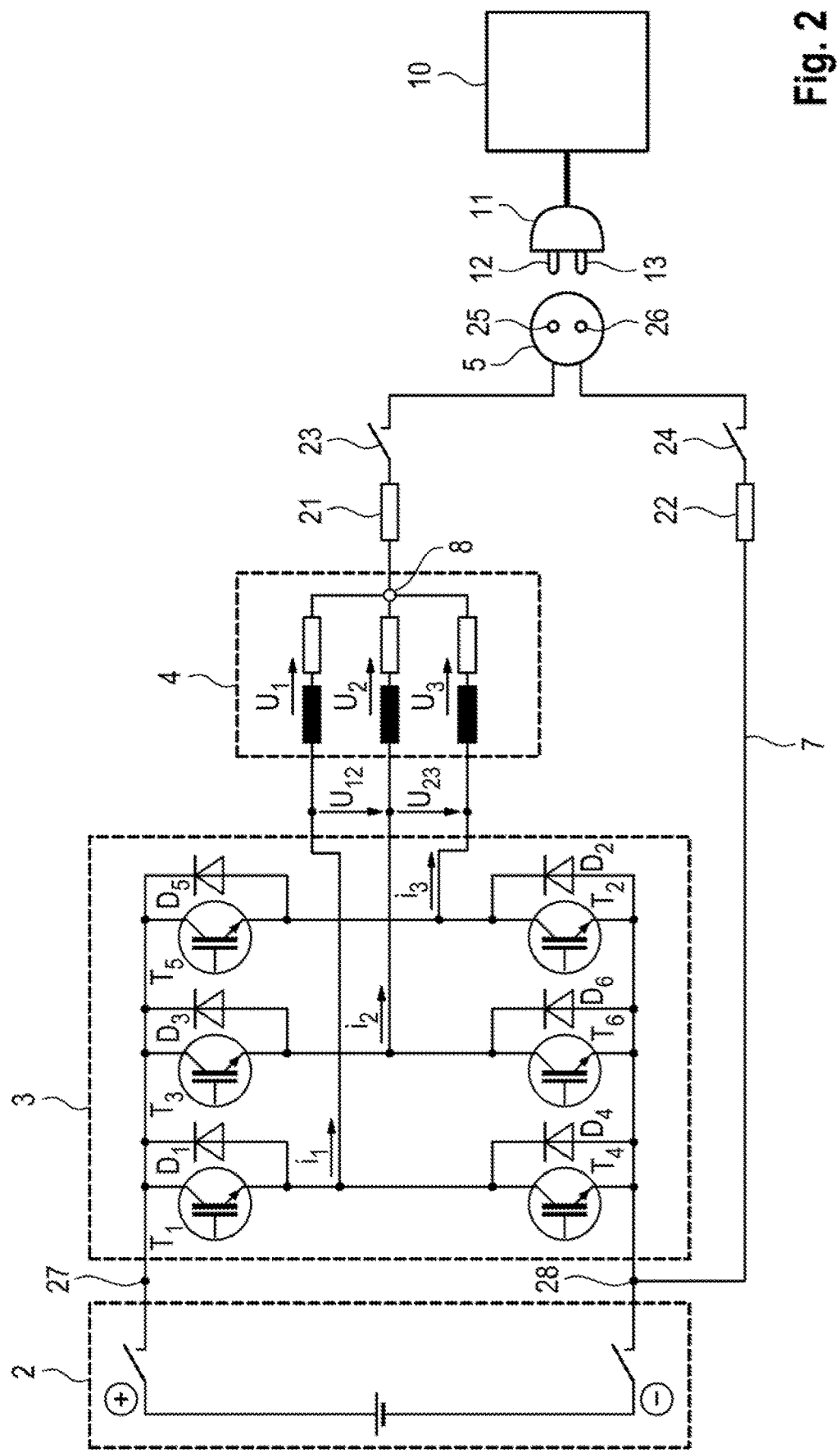
FIG. 2 illustrates the charging process according to aspects of the invention of the battery in an electric vehicle in greater detail.

The schematic illustration of the components involved in the charging process according to aspects of the invention is illustrated in greater detail in FIG. 2, wherein elements which are identical to those from FIG. 1 also have the same reference symbols as in FIG. 1 and will not be described again. As illustrated, the battery 2 has a positive pole and a negative pole. The battery 2 is connected to the inverter 3 via a first node 27 and a second node 28. The voltage of the battery 2 can be determined, for example, between the nodes 27, 28. In the example shown, the drive inverter 3 has three half-bridges with two switches per half-bridge in each case, wherein each half-bridge is coupled to a respective inductor of the electrical machine 4. A first optional fuse element 21 is interposed between the star point 8 of the electrical machine 4 and the first charging contact 25 of the vehicle-side charging socket 5. Similarly, a second optional fuse element 22 is interposed between the second node 28 and the second charging contact 26 of the vehicle-side charging socket 5. Furthermore, a switch-off device (first switch-off device 23 and second switch-off device 24) is connected between each of the fuse elements 21, 22 and the corresponding charging contact 25, 26. The switch-off devices 23, 24 remain switched on or activated during the initial phase of the charging process (during initialization and checking of the insulation), so that no current can flow from the direct-current charging apparatus 10 to the battery 2. The switch-off devices 23, 24 are switched off or deactivated and enable flow of the pre-charging current only after successful completion of initialization and checking of the insulation. During operation of the drive train 1 as a step-up converter, each of the phase inductors of the electric motor 4 (represented by solid black rectangles within the electric motor 4 in FIG. 2) are used—individually or simultaneously together with at least one further phase inductor. If, for example, the uppermost phase of the electric motor 4 is used, in the drive inverter 3, the first transistor T4, which represents a low-side switch of the inverter 3 in FIG. 2, corresponds to the switch which is operated in a clocked manner and functions as a switch of the step-up converter. If required, at least one of the two other low-side switches (that is to say transistor T6 and transistor T2) can additionally also be operated in a parallel docked manner, as a result of which the other branches of the electric motor 4 and of the inverter 3 are included in the step-up conversion of the voltage.

Proceeding from an exemplary case in which the topmost phase of the electric motor 4 is used for operating the step-up converter, the battery 2, together with a diode D1, which is arranged in the half-bridge by means of the switch T4, and a capacitor, not illustrated in FIG. 2, which is connected between the first node 27 and the second node 28, is short-circuited during the step-up conversion phase when the switch T4 is closed. The charging current from the direct-current charging apparatus 10 then flows only through the corresponding phase inductor of the electric motor 4. This leads to the build-up of a magnetic field within the inductor and therefore to the storage of energy. With the switch T4 open, the current flows through the load circuit, that is to say through the diode D1 and the battery 2. At the same time, the magnetic field of the inductor of the electric motor 4 decreases and therefore charges both the battery 2 and also the capacitor, not illustrated in FIG, 2, which is interposed between the first node 27 and the second node 28. If the switch T4 is closed again, this capacitor of the battery 2 further serves as a voltage source. The output voltage of the step-up converter across the battery 2 is, overall, on average higher than the charging voltage provided by the direct-current charging apparatus 10. In this way, an excessively low charging voltage of a direct-current charging apparatus 10 can be transformed into a higher voltage with which the battery 2 can be charged. However, since the input power has to be equal to the output power in accordance with the power balance of an ideal converter, an increased output voltage of the step-up converter results in an output current which is reduced to an equal extent.

Figure 3:
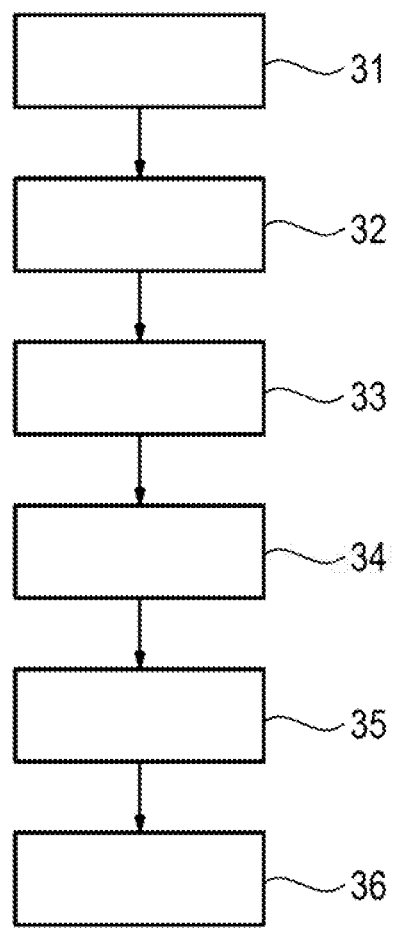
FIG. 3 shows a flowchart in which the thud according the invention is illustrated.

FIG. 3 illustrates an embodiment of the method according to aspects of the invention using a flowchart with reference to the entire system shown in FIG. 2. In a first step 31, the vehicle-side charging interface 5 is coupled to the direct-current charging apparatus 10, wherein the first pole of the direct-current charging apparatus 10, for example the negative pole 13, is coupled to the first pole of the HV battery 2, for example the negative pole, and the correspondingly other pole of the direct-current charging apparatus 10 is coupled to the star point 8 of the electric motor 4. In a next step 32, a first voltage is ascertained, which first voltage corresponds to the voltage of the battery 2. This can be determined, for example, between the first node and the second node 27, 28. In a next step 33, at least one switch of the inverter 3, which is arranged between the negative pole of the battery 2 and an inductor of the electric motor 4, is driven in such a way that the switch moves to clocked operation. In a next step 34, a second voltage is ascertained, which second voltage has become established owing to the clocked operation of the at least one switch of the inverter between the star point 8 of the electric motor 4 and the first pole of the battery 2. The second voltage can be ascertained, for example, between the first fuse element 21 and the second fuse element 22. In a next step 35, a difference between the second voltage and the DC charging voltage which is provided by the direct-current charging apparatus 10 is ascertained. Finally, in a next step, the DC charging voltage and/or the second voltage are adjusted if the ascertained difference exceeds a prespecified limit value.

In respect of the conventional charging process of an electric vehicle, as is defined in Section 3.2 "Normal Starting Process" of Appendix CC of IEC Standard 61851, a modified precharging request <5a> is made within the scope of the method according to aspects of the invention, in which the charging process takes place with a boost function for voltage synchronization with the direct-current charging apparatus. To this end, the processes defined in the standard at times t5 and (t6->t7) in the standard are executed in a modified manner.

What is claimed is:

1. A method for charging a battery of an electric vehicle at a direct-current (DC) charging apparatus, wherein the vehicle has an inverter, which is connected to the battery, and an electric motor, which is connected to the inverter, the electric motor having a star point, wherein the method comprises the steps of:
    connecting a vehicle-side charging interface to the DC charging apparatus, wherein a first pole of the DC charging apparatus is coupled to a first pole of the battery, and the second pole of the DC charging apparatus is coupled to the star point of the electric motor;
    ascertaining a first voltage which corresponds to the voltage of the battery;
    driving at least one switch of the inverter, the at least one switch arranged between the first pole of the battery and an inductor of the electric motor, such that the switch moves to clocked operation;
    ascertaining a second voltage established between the star point of the electric motor and the first pole of the battery by the clocked operation of the at least one switch of the inverter;
    ascertaining a difference between the second voltage and a DC charging voltage provided by the DC charging apparatus; and
    adjusting at least one of the DC charging voltage or the second voltage if the ascertained difference exceeds a prespecified limit value.

2. The method as claimed in claim 1, wherein adjusting the DC charging voltage comprises transmitting at least one message to the DC charging apparatus.

3. The method as claimed in claim 1, wherein adjusting the second voltage comprises adjusting a switch-on time of the at least one switch.

4. The method as claimed in claim 3, wherein the switch-on time of the at least one switch is set depending on the first voltage.

5. The method as claimed in claim 1, further comprising:
    deactivating an insulation apparatus for creating a current flow from the DC charging apparatus to the battery when the difference between the second voltage and the DC charging voltage is below the prespecified limit value.

6. The method as claimed in claim 1, wherein the inverter and the inductor of the electric motor are operated as step-up converters during charging of the battery.

7. The method as claimed in claim 1, further comprising:
    transmitting a precharging request to the DC charging apparatus for setting the DC charging voltage provided by the DC charging apparatus.

8. The method as claimed in claim 7, wherein the clocked operation of the at least one switch is performed at the same time as or after the first voltage is ascertained.

9. The method as claimed in claim 8, wherein the clocked driving of the at least one switch is performed by means of a PWM signal.

10. The method as claimed in claim 1, wherein the first pole of the direct-current charging apparatus and the first pole of the battery are poles of the same polarity.

* * * * *